United States Patent [19]

Tomatis

[11] Patent Number: 5,301,605
[45] Date of Patent: Apr. 12, 1994

[54] CURD RIPENING APPARATUS

[75] Inventor: Stefano Tomatis, Peveragno, Italy

[73] Assignee: CMT Costruzioni Meccaniche e Tecnologia SPA, Peveragno, Italy

[21] Appl. No.: 51,422

[22] Filed: Apr. 23, 1993

[30] Foreign Application Priority Data

Sep. 30, 1992 [IT] Italy .................. T092 A 000793

[51] Int. Cl.$^5$ .............. A01J 13/00; A01J 25/00; A23C 3/02; A23C 9/00
[52] U.S. Cl. ............................ 99/459; 99/452; 99/458; 99/461; 99/466; 210/402; 210/514; 366/226; 366/234
[58] Field of Search .......... 99/452, 454, 456–459, 99/460–462, 464–466, 495; 366/226, 234; 210/514, 319, 189, 528, 402, 404

[56] References Cited

U.S. PATENT DOCUMENTS

| | | | |
|---|---|---|---|
| 80,335 | 7/1868 | Colvin | 99/466 X |
| 808,320 | 12/1905 | Valerius | 99/466 X |
| 1,747,300 | 2/1930 | Hildebrandt-Sorensen | 99/459 |
| 2,608,759 | 9/1952 | Rishoi et al. | 99/466 |
| 3,368,278 | 2/1968 | Opie | 99/458 |
| 3,713,220 | 1/1973 | Kielsmeier et al. | 99/459 |
| 3,836,688 | 9/1974 | Fischer et al. | 99/452 X |
| 4,182,232 | 1/1980 | Tomatis | 99/461 |
| 4,331,069 | 5/1982 | Tomatis | 99/456 |
| 5,052,290 | 10/1991 | Nielsen | 99/461 |
| 5,125,329 | 6/1992 | Tomatis | 99/453 |

FOREIGN PATENT DOCUMENTS

| | | | |
|---|---|---|---|
| 671105 | 9/1963 | Canada | 99/458 |
| 3919479 | 12/1989 | Fed. Rep. of Germany | 99/466 |

Primary Examiner—Timothy F. Simone
Attorney, Agent, or Firm—Guido Modiano; Albert Josif; Daniel O'Byrne

[57] ABSTRACT

The curd ripening apparatus comprises two perforated, semicylindrical baskets (12, 30), rotatably supported on a common horizontal axis, one within the other. Curds are poured into the inside basket, and the outside basket is then rotated of 180° with respect to the other and is latched with latching means (26, 28, 40) to make it integral with the other basket (12, 24) in an angular position opposite to it, so that a closed barrel is formed. One or two motors (36, 38; 136, 138) can rotate both baskets together, so that the curds are rolled until ripe. The inside basket is preferably provided with internal, parallel, transverse blades (42).

13 Claims, 3 Drawing Sheets

CURD RIPENING APPARATUS

BACKGROUND OF THE INVENTION

This invention is concerned with a curd ripening apparatus for use in the production of provolone and other similar cheese.

In the production of provolone, the curds roughly drained of the whey must be left to ripen for several hours. In order to allow each part of the curd mass to come in contact with air, the curds, spread out on an airing tray, are frequently sliced and turned over during the ripening period. This involves considerable manual work, since past attempts to mechanize these steps have given rise to an excessive mangling of the curds, which negatively affects the quality of the final product.

SUMMARY OF THE INVENTION

The object of the invention is now to provide a curd ripening apparatus for mechanically slicing and turning over the curds, without any assistance and without mangling the curds.

The above object, as well as other objects and advantages such as will appear from the following disclosure, is attained by the invention by providing a curd ripening apparatus for the production of cheese, comprising:

a) an external basket having the shape of a cylindrical sector of at least semicylindrical breadth, and rotatable around a horizontal axis;

b) an external, perforated basket rotatable coaxially with the internal basket, having the shape of a cylindrical sector of a breadth complementary to the external basket and of a diameter smaller than the external basket;

c) first motor means for rotating a first one of said baskets; and d) synchronizing means for rotating a second one of said baskets synchronously with the first one, while the baskets are maintained selectively in positions nested or opposite to each other.

BRIEF DESCRIPTION OF THE DRAWINGS

The invention will now be described in more detail with reference to a preferred embodiment, given by way of illustrative and non-limiting example, and shown in the attached drawings, wherein.

DESCRIPTION OF A FIRST EMBODIMENTS

Figure 1:
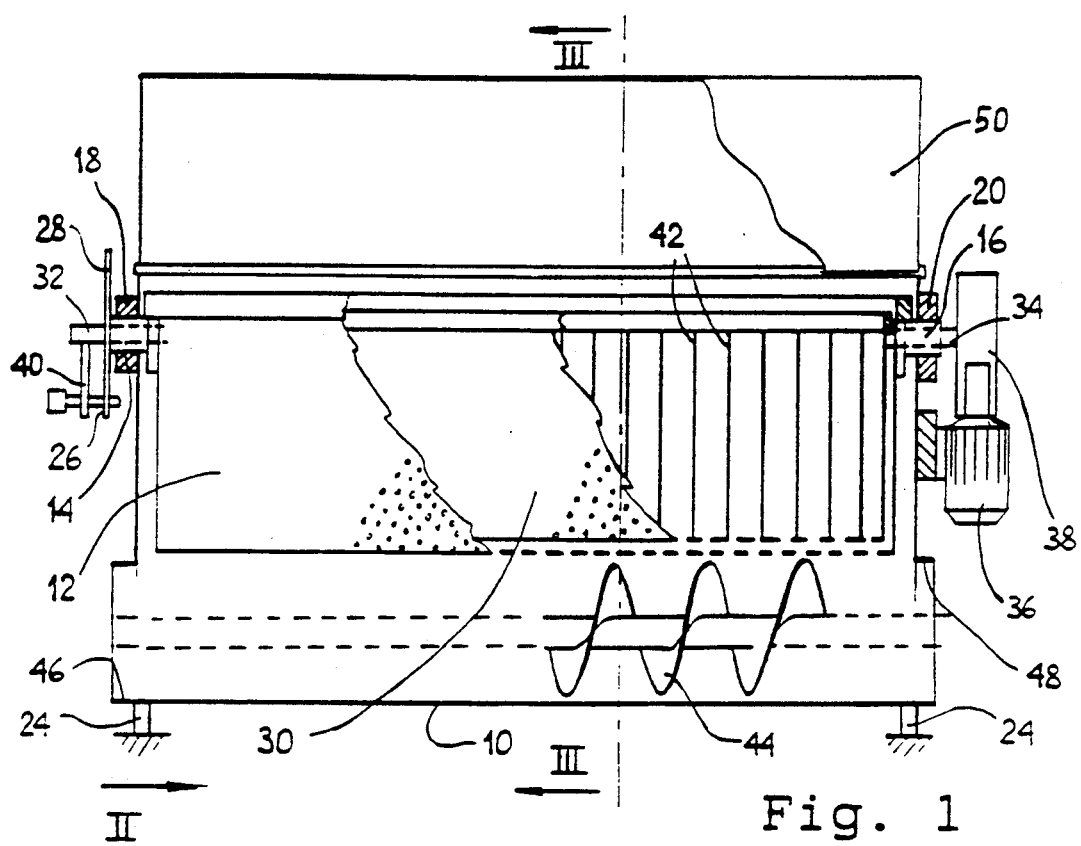
FIG. 1 is a view in side elevation, partially broken away, of a curd ripening apparatus according to the invention.

With reference to the Figures, the ripening apparatus comprises an elongated, horizontal trough 10, above which hangs a semicylindrical cradle or basket 12 having a side wall of perforated plate. The basket is rotatable around an axis longitudinal to trough 10, by means of hollow stub shafts 14, 16 which are journaled in cross-pieces 18, 20, themselves carried on uprights 22, 24. Radial arms 26, 28 are integrally carried by stub shaft 14.

Figure 3:
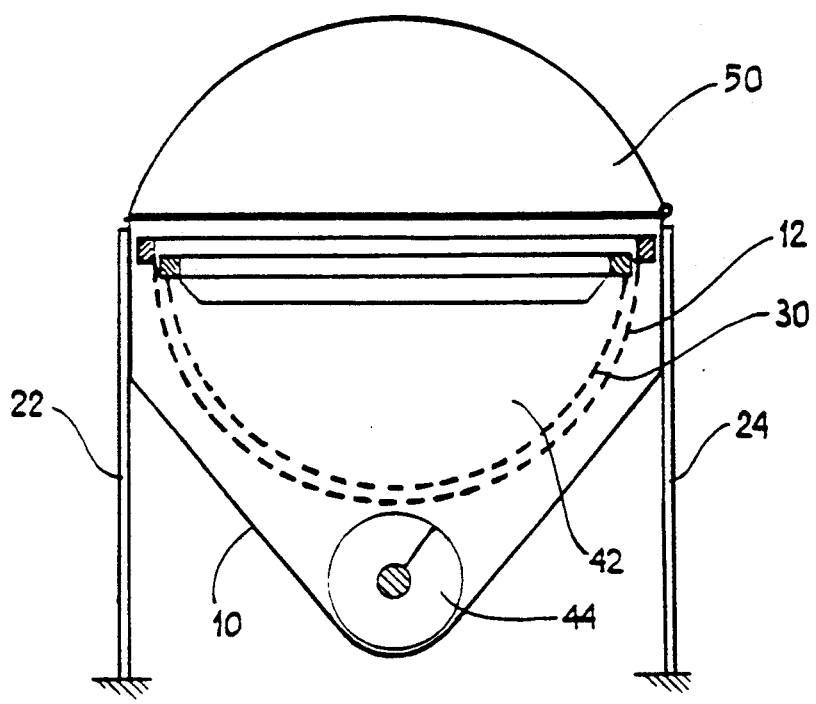
FIG. 3 and 4 are transverse cross-sectional views of the curd ripening apparatus of FIG. 1, with its cover closed and lifted, respectively.
Figure 4:
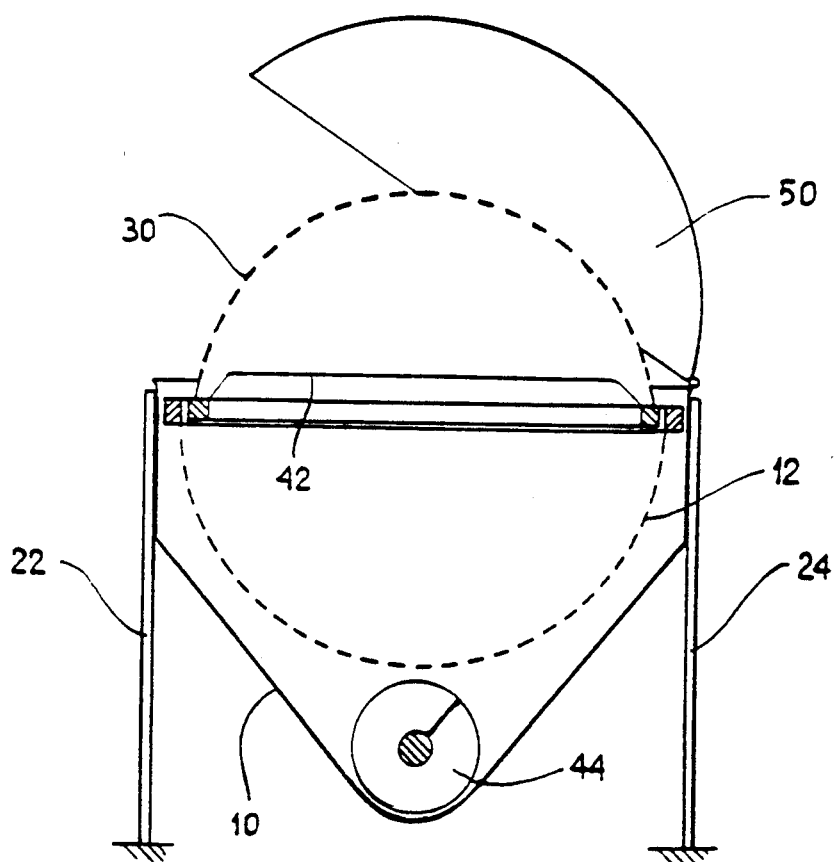

A further semicylindrical basket 30, having a diameter slightly smaller than basket 12, and having a side wall, is contained within the latter, and is rotatably supported by means of end shafts 32, 34 which are coaxially received within stub shafts 14, 16. Shaft 34 is driven by an electric motor 36 through a reduction gear 38 of a conventional construction, for rotating basket 30 around its axis. A latch 40 is integral with shaft 32 and can be engaged with one of arms 26, 28 in order to make baskets 12, 24 integral with each other in one of two relative positions: a first position, shown in FIGS. 1 and 3, where basket 30 is completely contained or rested within basket 12, and a second position, shown in FIG. 4, where basket 30 is offset by 180°, and is therefore opposite to basket 12, so that a substantially closed barrel is formed. Basket 30 also has a set of transverse, crescent-shaped blades 42 inside.

At the bottom of trough 10 a horizontal auger 44 is received. Auger 44 ends in one or two end openings 46, 48 and is driven by motor means not shown.

A hinged, convex cover 50 straddles trough 10 and both baskets contained within it. The cover is shown closed in FIGS. 1 and 3, and partially open in FIGS. 2 and 4.

Figure 2:
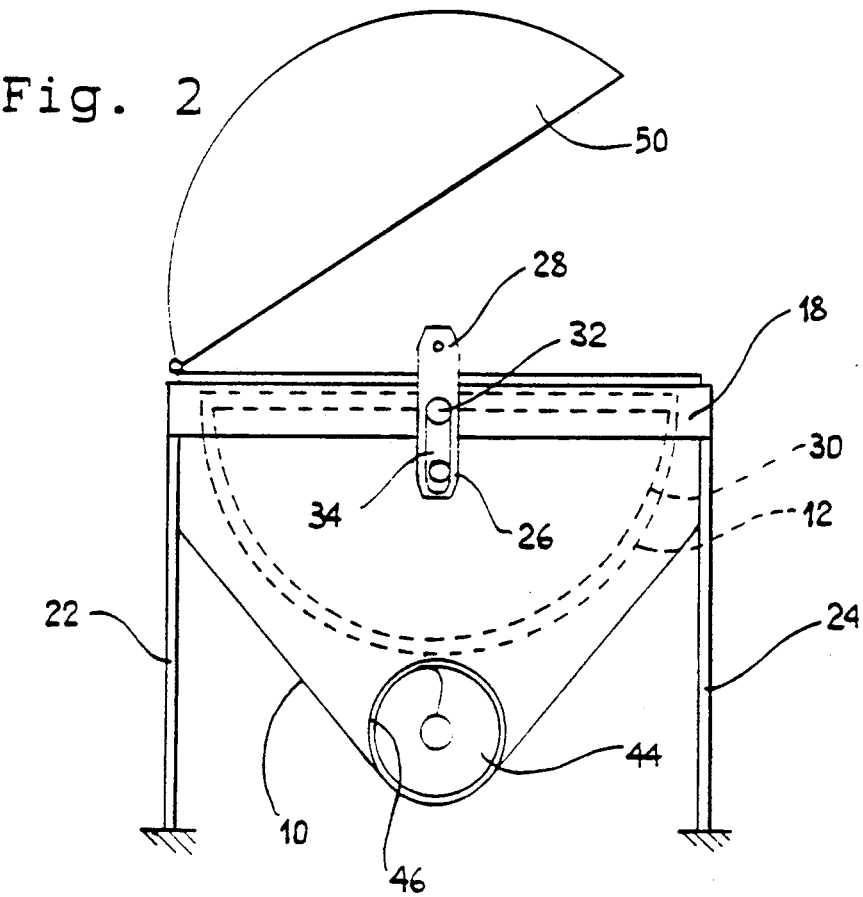
FIG. 2 is an end view of the curd ripening apparatus of FIG. 1, in the direction of arrow II, with its cover lifted.

In operation, the ripening apparatus described above is preferably at the side of a tipping cheesemaking vat not shown (e.g. according to IT-A-1 162 252 filed on Mar. 25, 1987), from which the partially drained curds are poured into basket 30, while basket 12 is down (FIG. 1). The whey which is still held in the curds can therefore drain through the perforated walls of baskets 12, 30. Basket 30 is then rotated by motor 36 to a position opposite basket 12, and latch 40 is engaged with arm 28, so that both baskets are made integral with each other to form a closed barrel. During the above operation, the curds contained in basket 30 fall by gravity to basket 12 below, with a degree of rolling motion.

After engagement of latch 40, a slow rotation of the barrel assembly is maintained. The curds therefore roll within the barrel under the action of gravity, and are subjected to a slicing action by blades 42 every time the curds revert to basket 30. Such continuous dicing progressively frees the whey which is still held within the curds, and the freed whey progressively falls to trough 10.

Due to the slow rotation and the rolling fall, the curds are not subjected to any rough handling, such as squeezing or extrusion, which might damage its properties. Within the enclosure surrounding barrel 12, 24, moisture and temperature can be kept substantially stable, with further advantage for the quality of the ripened curds which is obtained at the end of the operation.

When, after a few hours, the curds have reached the desired degree of ripening, the rotation of the barrel is stopped while the inside basket 30 is down, latch 40 is disengaged, and the outside basket 12 is allowed to revolve by gravity to the position of FIG. 1. Both baskets are hooked together in this position by engaging latch 40. The baskets are again rotated together to a tipped position (not shown), so that the curds may fall to the trough below, to be removed by auger 44.

In practice, a plurality of curd ripening apparatuses as disclosed above may be arranged end-to-end with each other, their respective end openings being connected together. In this way, by suitably timing the loadings of the individual ripening apparatuses, a quasi-continuous delivery of ripened curds can be obtained at the terminal end opening of the arrangement of ripeners. As an alternative, a plurality of baskets can be arranged in a row over one continuous trough. Two side-by-side rows of baskets above a single trough can also be envisaged.

DESCRIPTION OF A SECOND EMBODIMENT

Figure 5:
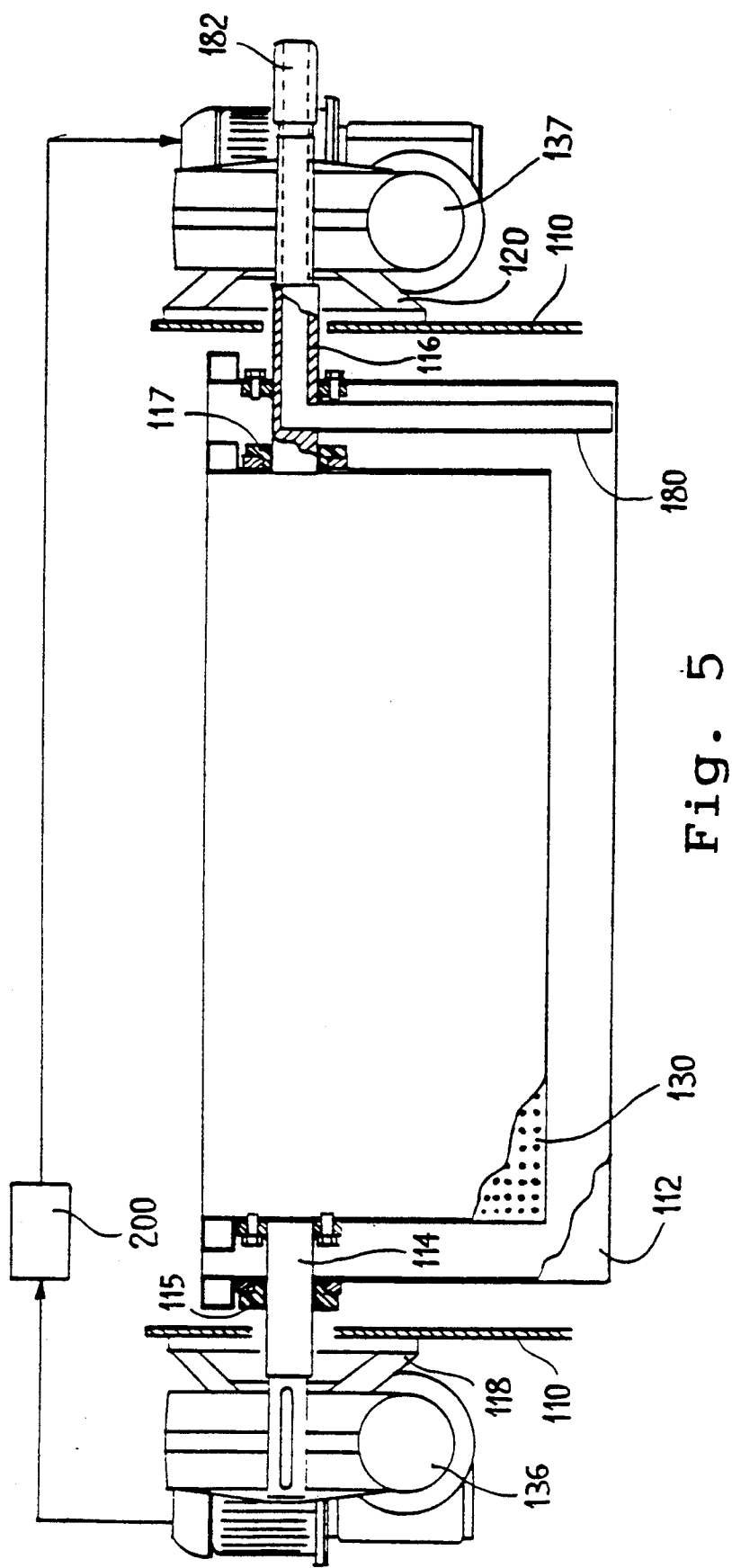
FIG. 5 is a partial view, in longitudinal cross-section, of a different construction of a curd ripening apparatus according to the invention.

A modification of the curd ripening apparatus according to the invention will now be described with reference to FIG. 5, where parts corresponding to parts on FIGS. 1 to 4 have the same reference numbers increased by 100. FIG. 5 only shows the baskets, and not the trough nor the cover of the ripening apparatus, the latter not requiring illustration since they are substantially similar with the ones of FIGS. 1 to 4.

Two stub shafts 114, 116 are journaled in the opposite ends of trough 110, and are drive by respective motor-and-reduction-gear units 136, 137, which are carried on respective cross-pieces 118, 120. An external semicylindrical basket 112, similar to basket 12 of FIGS. 1–4, rotatably supported on shaft 114, at one end, by means of a bearing 115 of a synthetic material, and is integral with shaft 116, at the opposite end.

An internal basket 130, similar to basket 30 of FIGS. 1 to 4, is coaxially contained within external basket 112, and is integral with shaft 114, at one end, while it is rotatably supported on shaft 116 at the opposite end, by means of a bearing 117 similar to bearing 115.

The two motor-and-reduction-gear units 136, 137 can be run independently or jointly in order to obtain the same operative modes of the machine as described above. If only motor 136 is run, only internal basket 130 is rotated, e.g. for tipping it by 180° with respect to basket 112 in order to obtain a substantially closed barrel. Both motors 136, 137 can then rotate the barrel by running at the same speed, in order to obtain stirring of the pasta filata as in the curd ripening apparatus of FIGS. 1 to 4. Latch 40 is thus replaced by the interlocking of both motors, such interlocking being achieved, for instance, by a well known electrical control, diagrammatically shown as 200.

The curd ripening apparatus of FIG. 5 is further provided with a suction tube 180, extending at right angles from shaft 116 and plunging in external basket 112. Suction tube 180 is connected with a conduit extending longitudinally within the shaft to a fitting 182. In the position shown, a pump (not shown) connected to fitting 182 can be used to draw whey from the bottom of basket 112, which, in such case, would have a solid, rather than a perforated, wall.

The preferred embodiments of the invention disclosed above may be modified within the spirit of the invention. For instance, internal basket 30 might be larger than a semicylinder, e.g. ⅝ or ¾ of a cylinder, with a corresponding reduction of the external basket, which would be reduced to ⅜ or ¼ of a cylinder.

Moreover, the preferred embodiment disclosed above could be improved with actuators and automatic devices known to a person skilled in the art. For instance, latch 40 could be driven by an actuator, and both the actuators and the electric motor could be controlled by an electronic or electromechanical program, in order to automate the operations described above.

I claim:

1. A curd ripening apparatus for the production of cheese, comprising:
 a) an external basket having the shape of a cylindrical sector of at least semicylindrical breadth, and rotatable around a horizontal axis;
 b) an internal, perforated basket rotatable coaxially with the external basket, having the shape of a cylindrical sector of a breadth complementary to the external basket and of a diameter smaller than the external basket;
 c) first motor means for rotating a first one of said baskets; and
 d) synchronizing means for rotating a second one of said baskets synchronously with the first one, while the baskets are maintained selectively in positions nested with or opposite to each other.

2. The curd ripening apparatus of claim 1, wherein each of the baskets is semicylindrical.

3. The curd ripening apparatus of claim 1, wherein the external basket has a breadth smaller than a semicylinder and the internal basket has a breadth larger than a semicylinder.

4. The curd ripening apparatus of claim 1, wherein each of said baskets is supported at both longitudinal ends on at least a first and a second mutually aligned stub shafts, which are journaled in respective stationary bearings.

5. The curd ripening apparatus of claim 4, wherein said first and second stub shafts are integral with said external and internal baskets, respectively, and are idle with respect to the other basket, respectively, and one of the stub shafts is driven by said first motor means.

6. The curd ripening apparatus of claim 5, wherein the shaft that is integral with the external basket contains a longitudinal conduit which is accessible through a fitting, and wherein a radial suction tube plunging in said external basket extends from said conduit.

7. The curd ripening apparatus of claim 1, wherein said synchronizing means comprise a disengageable mechanical latch between said baskets.

8. The curd ripening apparatus of claim 1, wherein said synchronizing means comprise second motor means driving the one of said stub shafts that is not driven by said first motor means, and controlled by said first motor means through an electric control.

9. The curd ripening apparatus of claim 1, wherein said external basket is also perforated.

10. The curd ripening apparatus of claim 1, wherein said internal basket is provided with a plurality of spaced blades across its axis.

11. The curd ripening apparatus of claim 1, further comprising a longitudinal, horizontal trough extending beneath said baskets.

12. The curd ripening apparatus of claim 11, wherein a horizontal auger extends within said trough.

13. The curd ripening apparatus of claim 11, wherein said trough extends longitudinally of said baskets and is sealable by means of a top cover.

* * * * *